United States Patent [19]
Al-Karmi et al.

[11] Patent Number: 5,862,251
[45] Date of Patent: Jan. 19, 1999

[54] OPTICAL CHARACTER RECOGNITION OF HANDWRITTEN OR CURSIVE TEXT

[75] Inventors: Abdel N. Al-Karmi, Unionville, Canada; Shamsher S. Singh, Rochester, Minn.; Baldev Singh Soor, Markham, Canada

[73] Assignee: International Business Machines Corporation, Armonk, N.Y.

[21] Appl. No.: 906,008

[22] Filed: Aug. 4, 1997

Related U.S. Application Data

[63] Continuation of Ser. No. 551,096, Oct. 31, 1995, abandoned.

[30] Foreign Application Priority Data

Dec. 23, 1994 [CA] Canada ................................. 2139094

[51] Int. Cl.$^6$ ....................................................... G06K 9/80
[52] U.S. Cl. ............................................. 382/186; 382/197
[58] Field of Search .................................. 382/186, 187, 382/177, 179, 197, 178, 185, 190, 195

[56] References Cited

U.S. PATENT DOCUMENTS

| | | | |
|---|---|---|---|
| 3,609,685 | 9/1971 | Deutsch .............................. | 382/198 |
| 4,024,500 | 5/1977 | Herbet .................................. | 382/178 |
| 4,654,873 | 3/1987 | Fujisawa et al. ................... | 382/178 |
| 4,731,857 | 3/1988 | Tappert .............................. | 382/178 |
| 4,773,098 | 9/1988 | Scott .................................. | 382/198 |
| 4,959,870 | 9/1990 | Tachikawa ......................... | 382/253 |
| 4,979,226 | 12/1990 | Sato .................................. | 382/197 |
| 5,001,765 | 3/1991 | Jeanty ................................. | 382/179 |
| 5,050,219 | 9/1991 | Maury ................................. | 382/186 |
| 5,101,439 | 3/1992 | Kiang ................................. | 382/174 |
| 5,111,514 | 5/1992 | Ohta .................................. | 382/177 |
| 5,151,950 | 9/1992 | Hullender .......................... | 382/187 |

*Primary Examiner*—David K. Moore
*Assistant Examiner*—Brian P. Werner

[57] ABSTRACT

A method for optical character recognition particularly suitable for cursive and scripted text follows the tracings of the script and encodes them as a sequence of directional vectors. Another aspect of the method adaptively preprocesses each word or sub-word of interconnected characters as a unit and the characters are accepted only when all characters in a unit have been recognized without leaving a remainder of any vectors in the unit.

4 Claims, 4 Drawing Sheets

OPTICAL CHARACTER RECOGNITION OF HANDWRITTEN OR CURSIVE TEXT

This is a continuation of application Ser. No. 08/551,096 filed on Oct. 31, 1995, now abandoned.

FIELD OF THE INVENTION

The present invention relates to the field of optical character recognition (OCR). In particular, it relates to optical character recognition of cursive, normal handwriting by individuals. It further relates to the OCR of text that is written or printed in a language where letters of the alphabet, even though small in number, may assume different shapes dependent on their position within a word, and which may connect to an adjacent character at their left, right, both, or not at all. The most important feature of the invention is that it does not attempt to segment words into characters before recognition; rather it follows the writing strokes or traces from beginning to end; and only then attempts recognition of characters in a word (as in English) or in a sub-word or word (as in Arabic). Thus, recognition of the written text before segmentation is non-deterministic and dictated by the text itself.

PRIOR ART OF THE INVENTION

Examples of prior art directed to character segmentation are the following United States Patent Nos:

U.S. Pat. No. 4,024,500 granted May 17, 1977, and titled "Segmentation Mechanism for Cursive Script Character Recognition Systems".

U.S. Pat. No. 4,654,873 granted Mar. 31, 1987, and titled "System and Method for Segmentation and Recognition of Patterns".

U.S. Pat. No. 5,001,765 granted Mar. 19, 1991, and titled "Fast Spatial Segmenter for Handwritten Characters".

U.S. Pat. No. 5,101,439 granted Mar. 31, 1992, and titled "Segmentation Process for Machine Reading of Handwritten Information".

U.S. Pat. No. 5,111,514 granted May 5, 1992, and titled "Apparatus for Converting Handwritten Characters onto Finely Shaped Characters of Common Size and Pitch, Aligned in an Inferred Direction".

U.S. Pat. No. 5,151,950 granted Sep. 29, 1992, and titled "Method for Recognizing Handwritten Characters Using Shape and Context Analysis".

In U.S. Pat. No. 4,773,098 granted Sep. 20, 1988, and titled "Method of Optical Character Recognition", individual characters are recognised by means of assigning directional vector values in contour determination of a character.

In U.S. Pat. No. 4,959,870 granted Sep. 25, 1990, and titled "Character Recognition Apparatus Having Means for Compressing Feature Data", feature vectors having components which are histogram values are extracted and compressed then matched with stored compressed feature vectors of standard characters.

U.S. Pat. No. 4,979,226 granted Dec. 18, 1990, and titled "Code Sequence Matching Method and Apparatus", teaches code sequence extraction from an input pattern and comparison with a reference code sequence for character recognition.

U.S. Pat. No. 3,609,685 granted Sep. 28, 1971, and titled "Character Recognition by Linear Traverse", teaches character recognition in which the shape of the character is thinned to be represented by a single set of lines and converted to a combination of numbered direction vectors, and the set of direction vectors is reduced to eliminate redundant consecutive identical elements.

U.S. Pat. No. 5,050,219 granted Sep. 17, 1991, and titled "Method of Handwriting Recognition" is abstracted as follows:

"A method of recognition of handwriting consisting in applying predetermined criterions of a tracing of handwriting or to elements of this tracing so that several characterizing features of this tracing or of these elements be determined, comparing characterizing features thus determined to characterizing features representative of known elements of writing and identifying one element of the tracing with one known element of writing when the comparison of their characterizing features gives a predetermined result, wherein the improvement consists in the setting up of a sequence of predetermined operating steps in accordance with predetermined characterizing features by applying criterions(sic) to the tracing elements."

The above United States patents are incorporated herein by reference, where permitted.

SUMMARY OF THE INVENTION

It has been found that a more efficient character recognition is achieved by encoding units of interconnected text tracings as a sequence of directions in a plane.

It has further been found that the amount of pre-processing, before recognition but after acquisition of the text image and noise reduction and filtering, is reduced if the input text is not segmented into constituent characters before it is presented to the recognition engine. Thus, the natural segmentation inherent in the text image (due to spacing between words and sub-words) is adhered to and exploited.

In the present disclosure and claims, "sub-words" mean the intra-connected portions of words that are bounded by a break in the cursive text, i.e. where successive characters are not bound by a ligature. Sub-words can be as long as the entire word or as short as one character, or even a portion of a character if, for example, the character includes a secondary feature.

Simply stated, the present invention provides an improvement to the known methods of optical character recognition comprising an intermediate step wherein an acquired text image consisting of a sequence of planar directional vectors is analyzed by the recognition engine in chunks of intra-connected sub-words.

In a preferred aspect of this invention, the sequence of directions is recognized as comprising a sequence of characters of said text only if all directions in the sequence corresponding to any one of the sub-words of interconnected text have contributed to recognition of said sequence of characters.

Preferably, the sequence of planar directional vectors is obtained by processing according to methods known in the art: a noise-reduced and filtered digitized text image as follows:

(a) thinning or skeletonizing the text image to its essential skeleton (among other methods, for example, as taught by T. Wakayam in a paper titled "A case line tracing algorithm based on maximal square moving", IEEE Transactions on Pattern Recognition and Machine Intelligence, VOL PAMI-L1, No. 1, pp 68–74);

(b) converting the thinned image to directional vectors representing the directional flow of the tracings by the sequential data stream of the digitized image (for example, directional vectors are assigned to each element of the skeleton by means of the "Freeman code"); and (c) applying at least one reduction rule to the string of directional vectors to reduce it in length and yield one form of abstract representation of a word or sub-word.

One simple reduction rule specifies that a directional vector immediately following an identical directional vector is discarded. This rule may be applied recursively to a string, reducing it considerably.

Once the above intermediate pre-processing steps have been applied, language specific identification of the sequence of directional vectors commences. For example, a set of grammar rules for a language would include a look-up table defining each alphabet character by its most abstract (i.e. reduced) sequence of directional vectors. Further rules may restrict connectivity on either side, or may specify secondary features of a character such as a dot or dots (as in Arabic) or an accent (as in French). It is clear, therefore, that some experimentation will be necessary before arriving at an optimal set of grammar rules for a given language. The grammar rules may include provision for idiosyncrasies of individual writers; for example, some people write part of the alphabet, and print some characters "r" and "s" being commonly printed in English handwriting. Some writers will cross a "t" with a horizontal stroke that does not intersect the vertical stroke.

BRIEF DESCRIPTION OF THE DRAWINGS

The preferred embodiment of the present invention will now be described in detail in conjunction with the drawings, in which.

DETAILED DESCRIPTION OF THE PREFERRED EMBODIMENT

Figure 1:
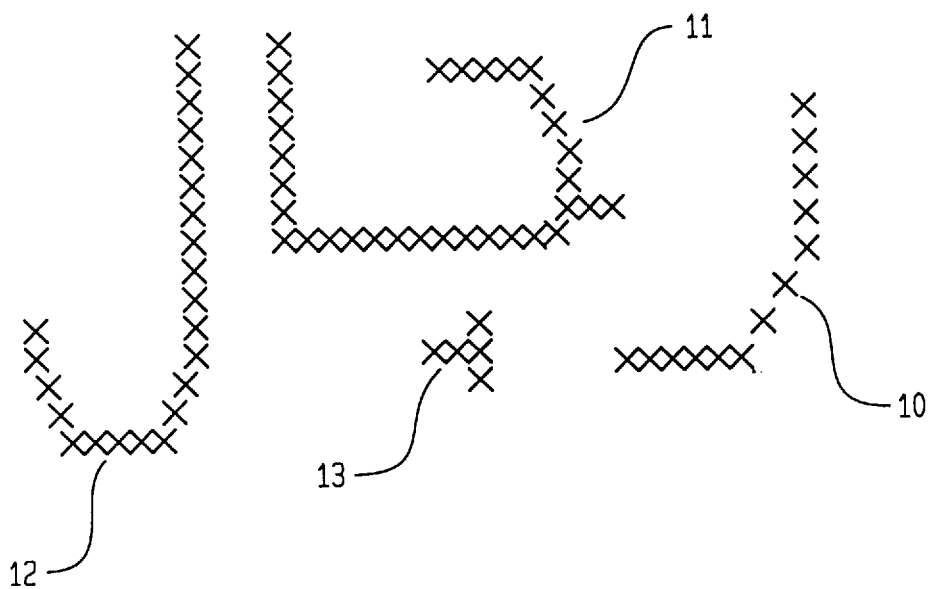
FIG. 1 depicts the skeleton of an example Arabic word "RIJAL" to which the method of the present invention is applied.

With reference to FIG. 1 of the drawings, the skeleton of the Arabic word "RIJAL" is shown ready for pre-processing. Of course, the word is actually provided as a data stream representing the elements of an image matrix. As may be seen from FIG. 1, the word has four independent sub-words. A first sub-word 10 is simply the Arabic letter "Ra"; a second sub-word the two letters "Geem" and "Alef" 11; a third sub-word is the letter "Lam" 12; and the fourth sub-word is a secondary feature (SF) 13, being a "dot" under "Geem" in sub-word 11.

Figure 2:
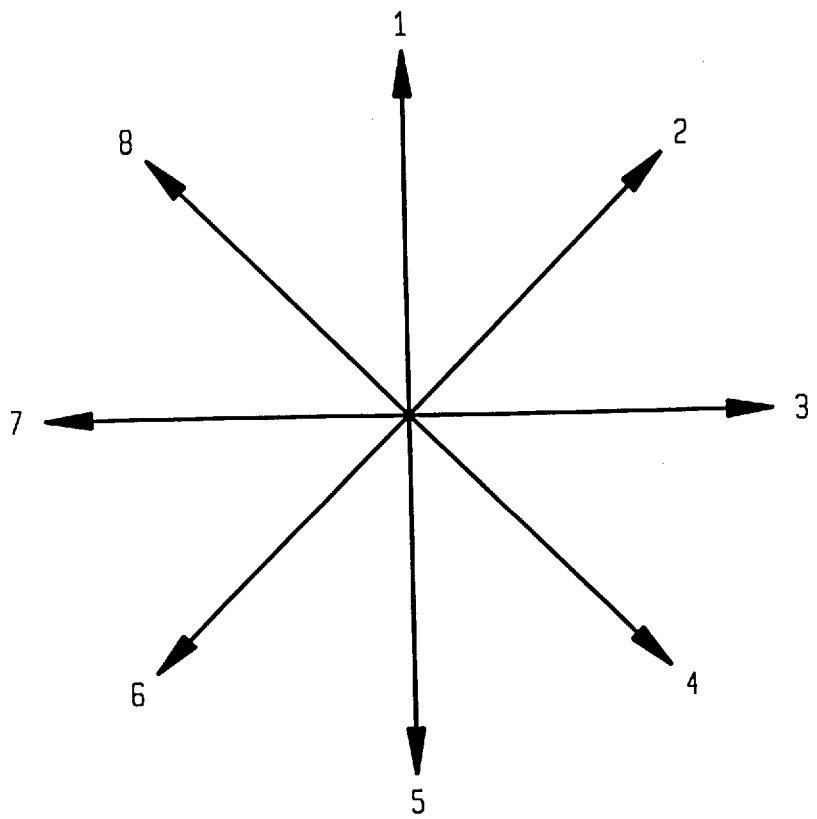
FIG. 2 shows eight directional vectors that can be used to encode a skeletonized word or sub-word into a string of directional vectors.

Applying the directional vectors (1 to 8) as shown in FIG. 2 to the sub-words of FIG. 1, results in a sequence for the first sub-word 10 as follows:

55555556666666677777777

By applying the example reduction rule, whereby the second identical directional vector is discarded, successively, the above-sequence is reduced simply to (5,6,7,$), the $ sign meaning end of sub-word.

By analogy, the entire word of FIG. 1 is reduced to the following coded string:

(5,6,7,$), (3,4,3,7,8,1,$), (SF), (5,6,7,8,1,$).

Figure 3:
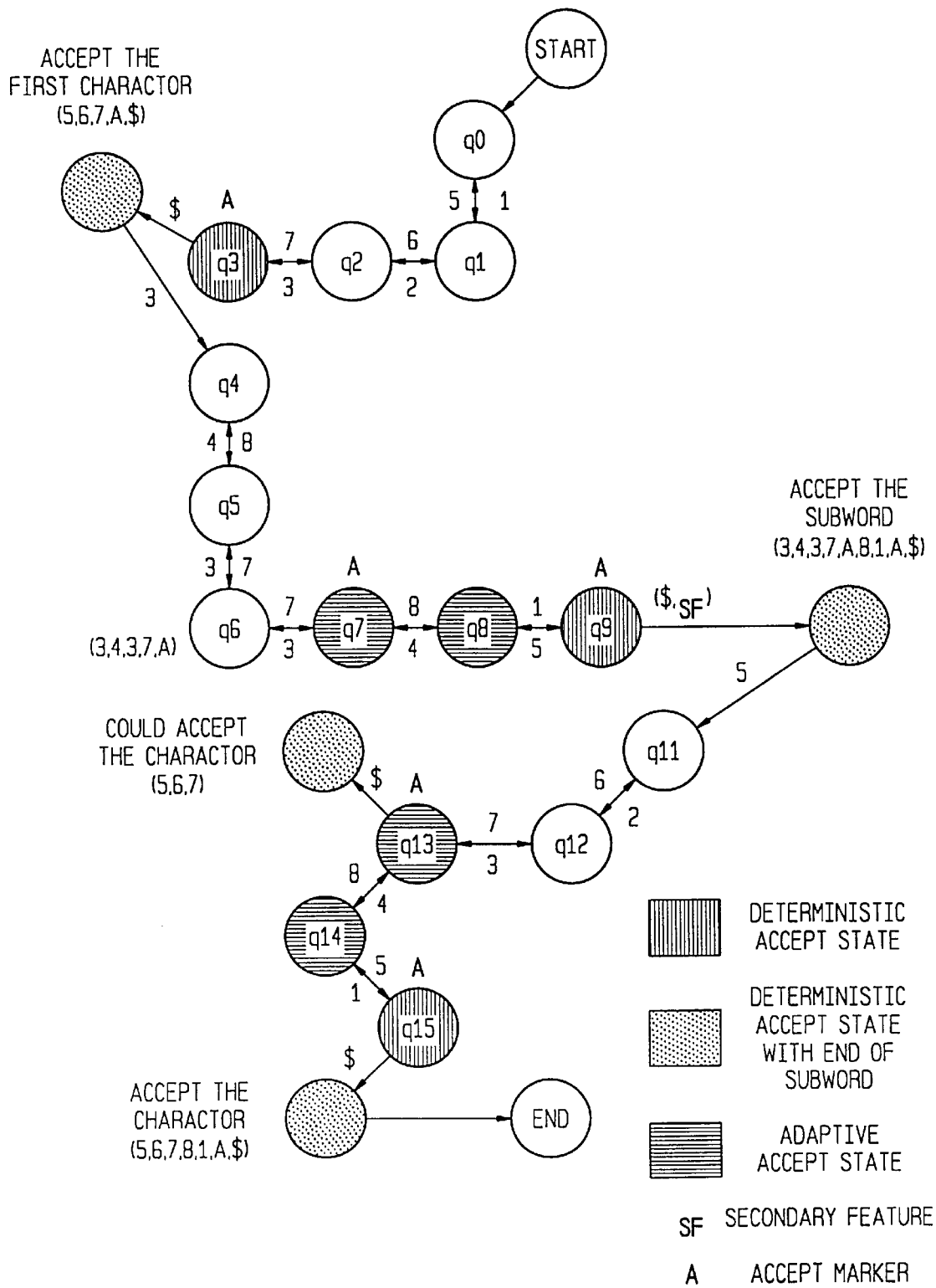
FIG. 3 depicts the states of a non-deterministic state machine for processing the encoded word "RIJAL" shown in FIG. 1.

It is this string that is applied to the state machine of FIG. 3, which proceeds from "start" through the transitions from q0 to q1 (5), q1 to q2 (6) and q2 to q3 (7). Because at q3 the first sub-word 10 terminates, the q3 state is a deterministic "accept state", since the vectors "5,6,7" are identified as the letter "Ra" and no directional vectors remain before "$".

The first sequence, therefore, identifies the first sub-word 10 as one letter (Ra). The second sequence (obtained by going from q4 to q9) is another sub-word 11 which comprises two letters. The (SF) indicates a presence of a secondary feature. The system will try to accept the sequence as it is pushed on to the system stack. The sequence, "3,4,3,7" is one letter while the other "8,1" is another. The following is the stack processing sequence:

* 3

* 4 3

* 7 3 4 3; (accept one letter);

* A

* 8 A

* 1 8 A

* $ 1 8 A; (accept the second letter), the "A" is the marker indicating acceptance of the preceding vector sequence (i.e. preceding letter).

The third sub-word 12 is the interesting one. The third sequence is for one letter but can be split into two letter sequences (5,6,7), (8,1). The stack processing looks like this:

|  | Commentary |
| --- | --- |
| * 5 | First vector following previous marker |
| * 5,6 | Second vector |
| * 5,6,7 | Third vector |
| * A | Recognize character and insert acceptance marker |
| * A,8 | Next vector |
| * A,8,1 | Second next vector |
| * A,8,1,$ | Reach end of sub-word |
| * A,B,$ | ("B" is a marker for acceptance of a second letter.) Problem: "A" as accepted may not be connected at its left, according to the language specific grammar rules for Arabic |
| * 5,6,7,8 | Remove marker (A) and test back to previous marker, and add one vector to sequence |
| * 5,6,7,8,1 | Next vector |
| * C | Recognize sub-word and insert marker (C) |
| * C$ | End of sub-word confirms recognition |

Thus, consulting the language specific grammar rules yielded that the (5,6,7) sequence is a separate character (the "alef") that may not be connected to any other character to its left. The (8,1) sequence is also a separate character but when processing is finished the stack is not empty; therefore, there is something following. Hence, the result cannot be accepted. The system then adaptively expands the previously parsed sequence to become (5,6,7,8,1) and attempts to recognize the new sequence. This yields the correct interpretation of the third sub-word.

Thus the method parses the elements applied adaptively and follows the natural spatial parsing of a language before individual character recognition.

Each word and sub-word is thus transformed into a sequence of directional vectors. The recognition process starts as this list of elements is fed into the state machine, herein called Non-deterministic Finite Automata (NFA). The NFA will accept this sequence of directional vectors if and only if there exist pre-defined transition states (based on this sequence), that progress from the initial state to the final state. The fact that this is a non-deterministic state machine leads to the flexibility of accepting all inputs depending on the input sequence. It is not unusual to have a deterministic finite state machine constructed from an NFA. But in this case, such a Deterministic Finite Automata (DFA) will contain a large number of states defined by 2 to the power of Q where Q is the number of states in the machine. However it is not necessary to have all these states used. This is exploited within NFA.

What this means is that the NFA will encompass all possible words that are formed in a given alphabet, even though some of the "words" formed are meaningless and therefore not acceptable. This can be handled by the use of a dictionary, for example. Since the recognition is based on a scanned image that is subsequently thinned to produce directional vectors, the production rules of the NFA will allow the system to either accept or reject this formation. The possibility of rejecting a sequence is understandable. But what the NFA will attempt to do prior to rejecting the sequence is to attempt to "re-format" the string to see if the sequence can be accepted with more or fewer input elements. This adaptive nature of the NFA makes it very powerful as a recognition engine and in its recognition rate.

Figure 4A:
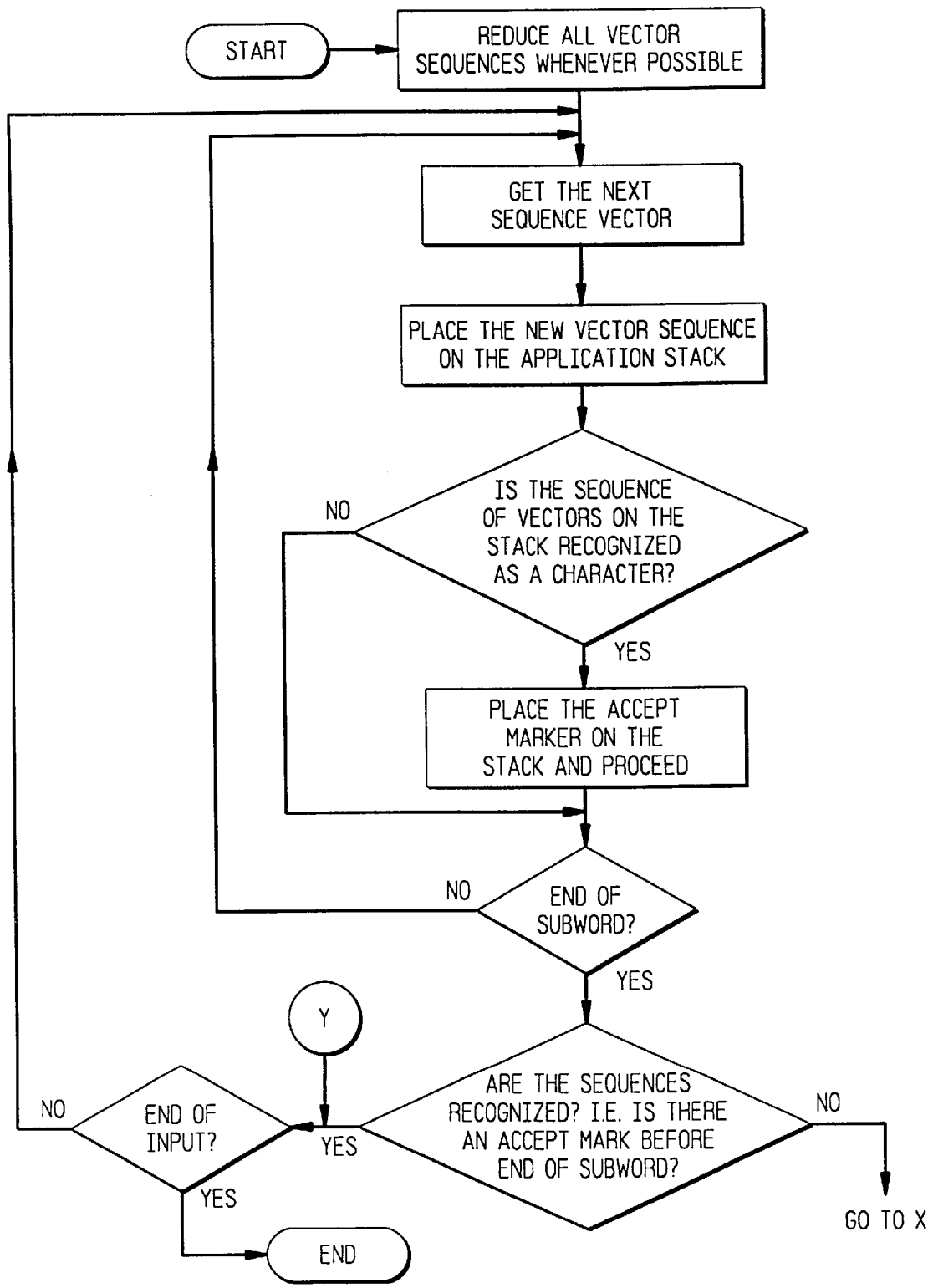
FIGS. 4a and 4b are a high-level flow chart explaining the operation of the present invention.
Figure 4B:
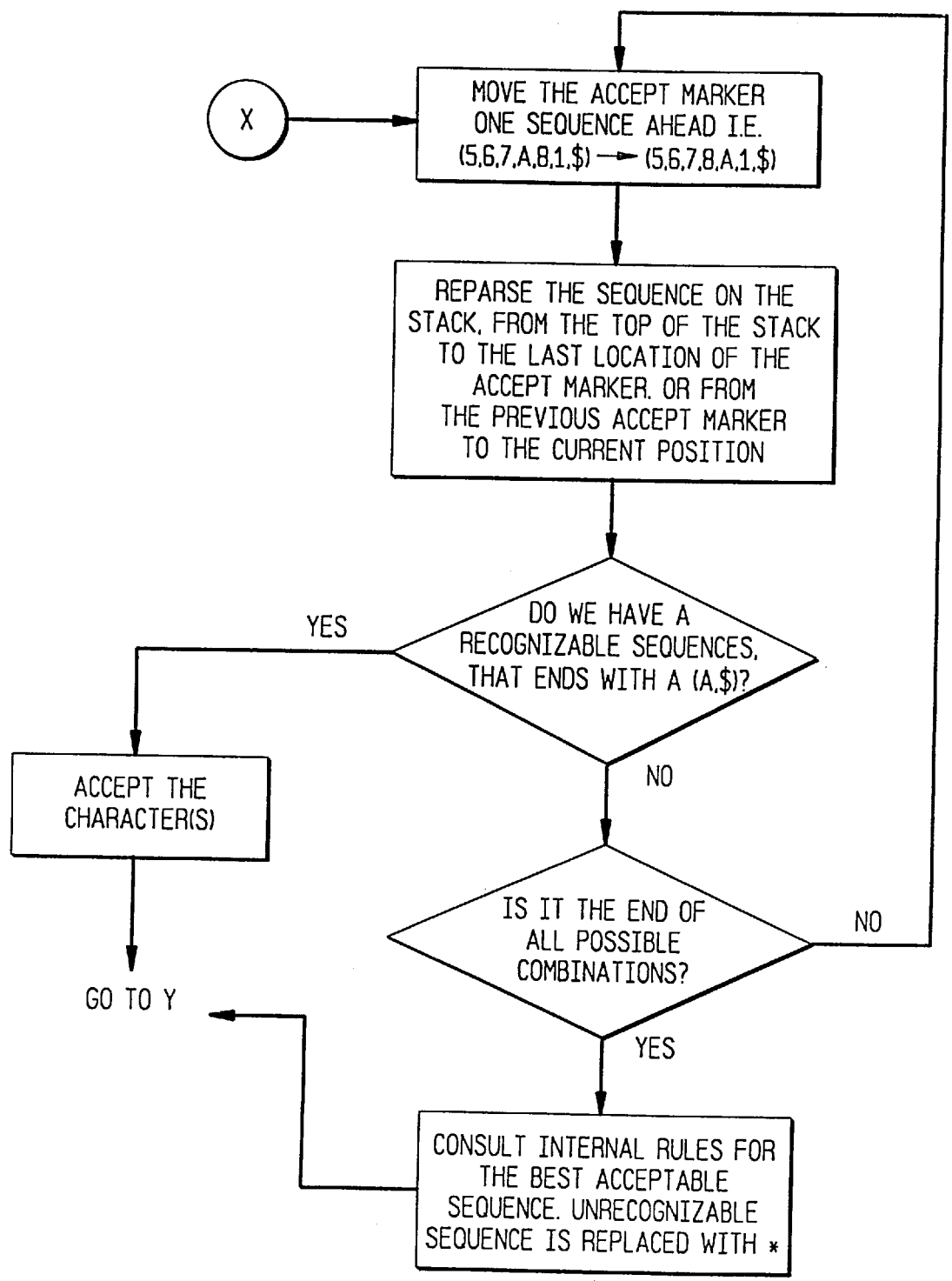

A high-level flow chart for implementing the NFA approach shown in FIG. 3 is shown in FIGS. 4a and 4b. The flow chart is largely self-explanatory in light of the foregoing description, except for the language specific grammar rules. An example of such rules (in pseudo-code) is given below for the Arabic language.

```
/* Grammar Rules - Arabic */
/* TOKENS. */
    <punctuator> => OP_SEARCH
    <number> => NO_SEARCH
    <eof>
/* KEYWORDS. */
    UpwardOneDot UpwardTwoDots UpwardThreeDots
    DownWardOneDot DownWardTwoDots DownWardThreeDots
    One Two Three Four Five Six Seven Eight
/* PUNCTUATORS. */
    .$#
/* TERMINALS. */
/* 1 2 3 4 5 6 7 8 */
/* NONTERMINALS. */
    Input
      -> File <eof>
    File
      -> SubWordSequence
      -> File SubWordSequence
SubWordSequence
      -> FeatureVector SubwordSequence
      -> SecondaryFeature SubWordSequence
      -> CharacterSequence Separator
      -> CharacterSequence PinSequence
      -> CharacterSequence SubwordSequence
CharacterSequence (the twenty-eight letters of the alphabet)
      -> Alef
      -> Ba
      -> Ta
      -> Tha
      -> Geem
      -> Hah
      -> Kha
      -> Dal
      -> Thal
      -> Ra
      -> Za
      -> Seen
      -> Sheen
      -> Tae
      -> Thae
      -> Sad
      -> Dhad
      -> Kaf
      -> Lam
      -> Meem
      -> Noon
      -> Ha
      -> Waw
      -> Ya
      -> Eain
      -> Ghain
      -> Ghaf
      -> Fa
(Definition of reduced character skeletons)
Alef
      -> 8,1,$
Lam
      -> 5,6,7,8,1,$
Ba
      -> 5,6,7,8,1,
        SecondaryFeature1, $
Ta
      -> 5,6,7,8,1,
        SecondaryFeature2, $
Tha
      -> 5,6,7,8,1,
        SecondaryFeature3, $
Geem
      -> 3,4,3,6,7,
        SecondaryFeature1, $
Hah
      -> 3,4,3,6,7,$
Kha
      -> 3,4,3,6,7,
        SecondaryFeature4, $
Dal
      -> 4,6,7,$
Thal
      -> 4,6,7,SecondaryFeature4, $
Ra
      -> 5,6,7,$
Za
      -> 5,6,7,SecondaryFeature4,$
Seen
      -> 5,6,7,8,4,7,8,4,7,$
      -> 5,6,7,8,4,7,8,4,7,5,6,7,8,1,$
Sheen
      -> 5,6,7,8,4,7,8,4,7
        SecondaryFeature3, $
      -> 5,6,7,8,4,7,8,4,7,5,6,7,8,1,SecondaryFeature3, $
Tae
      ->
                    . . . (and so forth)
SecondaryFeature
      -> DownWardOneDot
PinSequence
      -> 8,6
/* END. */
```

The method of the invention may also be applied, for example, to cursive or handwritten English. The following is an example of how the word "eat" would be processed.

Once "eat" is scanned and skeletonized, the following sequence of vectors appears.

2,4,6,7,5,4,3,2,2,3,4,8,7,6,5,4,3,1,5,3,2,1,5,3,7,5,4,3, EOF

Note that this sequence of vectors is for only one subword which in this example happens to be the complete word. As the recognition scheme starts, the first letter, namely the "e" will be parsed and the first sequence (2,4,6,7) can be ambiguously identified as the letter "0", however, the next sequence (5,4,3,2) will not be recognized and hence the letter "e" can be obtained. The ambiguity increases as the sequence continues. Depending on the reduction and language rules, the second sequence (2,3,4,8,7,6,5,4,3,2,5) can be identified as either, "a", "u" or "o". Such situations are normally handled by enriching the language rules, by adding more than one sequence to identify the letter. Such procedure is normal to any cursive text that poses a large degree of ambiguity.

Advantages of the present method are that: it is font-independent; it recognizes script regardless of where the person breaks the script; and it deals with typesets or stacked characters, for example, calligraphy.

With reference to FIG. 2 of the drawings, it may be advantageous to utilize more than eight directional vectors for finer resolution, e.g. 16, 32, etc. However, eight allows approximation of circular forms and is the minimum number required for most applications.

The embodiments of the invention in which an exclusive property or privilege is claimed are defined as follows:

1. A method for optical character recognition of scanned cursive, handwritten text, comprising the steps of:
   (a) processing a scanned text image in units of interconnected characters comprising words or subwords including coding said units of interconnected characters into a sequence of directional vectors corresponding to sequential directions in said scanned text image prior to identification of single constituent characters of said words or subwords;
   (b) reducing the sequence of directional vectors to a minimum sequence to yield an abstract directional representation of intra-connected sub-units of said scanned text image, wherein said reducing step comprises the steps of:
      (i) selecting a first directional vector in said sequence;
      (ii) selecting a second directional vector in said sequence immediately following said first directional vector; and
      (iii) if said second directional vector is identical to said first directional vector, then discarding said second directional vector from said sequence,
   wherein said steps (i) to (iii) are repeated until no directional vector in said sequence is followed by an identical directional vector;
   (c) upon recognition of a character, inserting a marker into the sequence of vectors directly following the vector that enables recognition; and
   (d) moving said marker within the sequence of vectors until all vectors in the sequence contribute to recognition of the sequence of characters wherein said sequence of directional vectors are compared with grammar rules; and
   (e) recognizing said text based on steps (c) and (d).

2. An improved method for optical character recognition of handwritten cursive scanned text, comprising the steps of:
   (a) skeletonizing a scanned text image;
   (b) processing said skeletonized text image in units of interconnected characters comprising words or subwords into a sequence of directional vectors corresponding to sequential directions in said scanned text image;
   (c) reducing the sequence of directional vectors to a minimum sequence to yield an abstract directional representation of intra-connected sub-units of said scanned text image, wherein said reducing step comprises the steps of:
      (i) selecting a first directional vector in said sequence;
      (ii) selecting a second directional vector in said sequence immediately following said first directional vector; and
      (iii) if said second directional vector is identical to said first directional vector, then discarding said second directional vector from said sequence,
   wherein said steps (i) to (iii) are repeated until no directional vector in said sequence is followed by an identical directional vector;
   (d) upon recognition of a character, inserting a marker into the sequence of vectors directly following the vector that enables recognition;
   (e) reparsing the sequence of directional vectors by moving the marker within the sequence of vectors until all vectors in the sequence contribute to recognition of said sequence of characters prior to identification of single constituent characters of said words or sub-words wherein said sequence of directional vectors are compared with grammar rules; and
   (f) recognizing said text based on steps (d) and (e).

3. The method as defined in claim 2, wherein the reparsing is accomplished by moving the marker by an amount of one vector forward in the sequence of vectors.

4. The method as defined in claim 2, wherein the reparsing is accomplished by moving the marker by an amount of one vector backward in the sequence of vectors.

* * * * *